US005389344A

United States Patent [19]

Copeland et al.

[11] Patent Number: 5,389,344

[45] Date of Patent: Feb. 14, 1995

[54] VARIABLE CONCENTRATION, SOLID CHEMICAL DISPENSER

[75] Inventors: James L. Copeland, Burnsville, Minn.; John E. Thomas, River Falls, Wis.; Daniel K. Boche, Eagan, Minn.; James D. Decker, Apple Valley, Minn.; Daniel F. Brady, Eagan, Minn.

[73] Assignee: Ecolab Inc., St. Paul, Minn.

[21] Appl. No.: 131,653

[22] Filed: Oct. 5, 1993

[51] Int. Cl.[6] .......... B01D 11/00; B08B 3/04

[52] U.S. Cl. .......... 422/264; 422/263; 134/93; 68/17 R

[58] Field of Search .......... 422/263, 264, 264 B; 222/189; 137/268; 239/222.11, 310, 379; 134/7, 172, 198, 93; 68/17 R

[56] References Cited

U.S. PATENT DOCUMENTS

| | | | |
|---|---|---|---|
| 3,089,508 | 5/1963 | Schulze et al. | 422/264 X |
| 3,870,471 | 3/1975 | Tepas, Jr. et al. | 422/264 B X |
| 4,420,394 | 12/1983 | Lewis | 422/263 X |
| 4,462,511 | 7/1984 | Fulmer et al. | 222/52 |
| 4,571,327 | 2/1986 | Larson et al. | 422/263 |
| 4,635,666 | 1/1987 | Daley et al. | 134/172 |
| 4,687,121 | 8/1987 | Copeland | 222/64 |
| 4,690,305 | 9/1987 | Copeland | 222/52 |
| 4,826,661 | 5/1989 | Copeland et al. | 422/263 X |
| 4,836,229 | 6/1989 | Lakhan et al. | 134/93 |
| 4,858,449 | 8/1989 | Lehn | 137/268 X |
| 4,867,193 | 9/1989 | Hayashi et al. | 68/17 R X |

*Primary Examiner*—Robert J. Warden
*Assistant Examiner*—E. Leigh Dawson
*Attorney, Agent, or Firm*—Merchant, Gould, Smith, Edell, Welter & Schmidt

[57] ABSTRACT

Disclosed is a dispenser 10 for a solid chemical 13 and a method of dispensing the chemical 13. Water enters via an inlet line 22 and is sprayed from a spray nozzle 21, so that the solid chemical 13 is dispensed in the form of an aqueous chemical solution via outlet line 17. The solution's concentration is adjustable by varying the distance between the spray nozzle 21 and the exposed dissolving surface of the chemical 13. A pair of cam members 50, 51 adjust the vertical position of the solid chemical 13 with respect to the spray nozzle 21. In a preferred embodiment, a visual indication of the concentration settings is provided, with the concentration settings corresponding to the nozzle-to-eroding surface distance.

21 Claims, 4 Drawing Sheets

FIG. 6
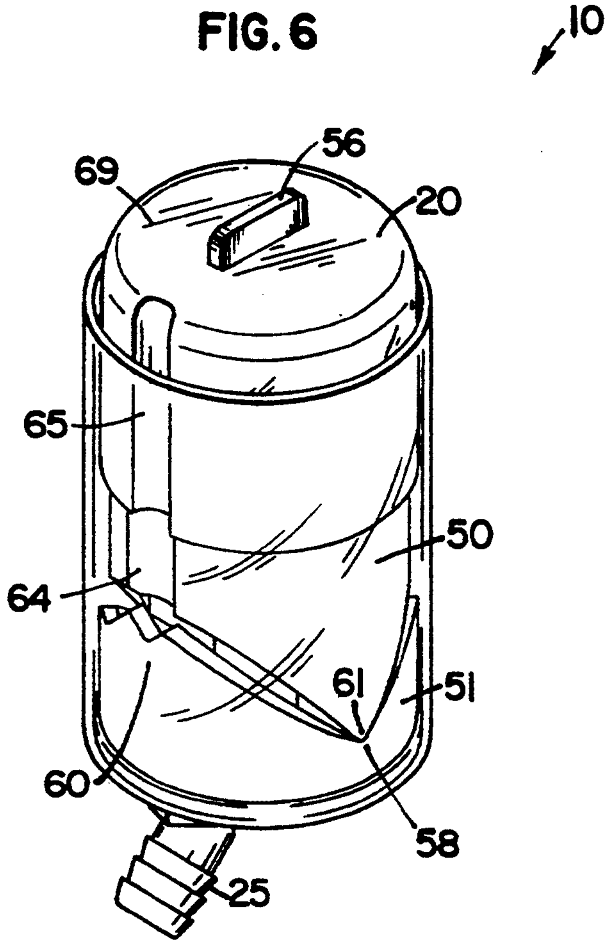
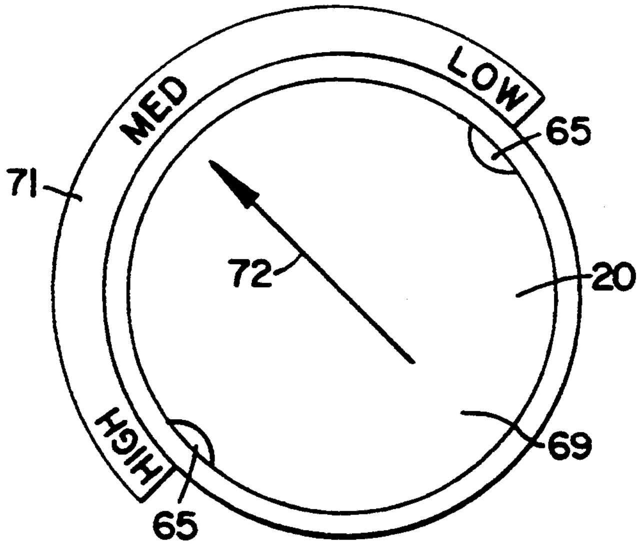
FIG. 7

VARIABLE CONCENTRATION, SOLID CHEMICAL DISPENSER

FIELD OF THE INVENTION

The invention relates broadly to the dispensing of water-soluble compositions used in cleaning processes. More specifically, the invention relates to the dispensing of a concentrated cleaning solution from a solid cleaning composition. The concentrated cleaning solution is created by contacting the solid cleaning composition with a dissolving liquid. Cleaning compositions include compounds such as detergents, rinse aids, and the like employed in cleaning fabrics, dishes and hard surfaces.

BACKGROUND OF THE INVENTION

A number of different techniques have been developed and used for converting solid chemicals used in cleaning processes into a concentrated solution. For example, devices designed for a powdered, flaked or granular detergent are disclosed in Daley et al, U.S. Pat. No. 3,595,438, issued Jul. 27, 1991; Moffet et al, U.S. Pat. No. 4,020,865, issued May 3, 1977; and Larson et al, U.S. Pat. No. 4,063,663, issued Dec. 20, 1977. Another form of solid detergent is the pre-shaped detergent briquette. Dispensing systems for dissolving detergent briquettes are known in the art. See, for example, U.S. Pat. Nos. 2,382,163; 2,382,164; and 2,382,165 all issued Aug. 14, 1945 to MacMahon; and U.S. Pat. No. 2,412,819, issued Dec. 17, 1946 to MacMahon.

A more recent form of solid detergent is the "cast" or block form, comprising detergent cast within a mold or container. Dispensing systems for these solids are known in the art. See, for example, U.S. Pat. No. 4,426,362, issued to Copeland et al and commonly owned U.S. Pat. Nos. 4,569,781 and 4,569,780, issued Feb. 11, 1986, to Fernholz et al. The cast detergent is dispensed by spraying a solvent onto the detergent block within the container, thereby dissolving the exposed surface of the detergent to form a concentrated working solution. The concentrated working solution falls into a reservoir or is directed by a conduit to the wash tank of a washing apparatus. When the chemical compound within the container is completely utilized, the exhausted container may be simply discarded and a fully charged container may be placed in the dispenser.

Solid, cast chemicals used in cleaning processes are preferably cast in a sturdy container which can act as a mold, a shipping and storage container, and a dispenser housing. The cast chemical may be dispensed by inverting the container over a spray nozzle and impinging solvent directly onto the exposed surface or surfaces of the chemical contained therein. The container may either be retained within the dispenser as the chemical is being used, or the chemical may be removed from the container and placed into the dispenser. However, hazardous chemicals used in cleaning processes such as highly alkaline detergents are preferably packaged such that they can be dispensed without coming into physical contact with the human body.

Known dispensing devices have sought to maintain a relatively constant rate of the chemical being dispensed, or a constant concentration, by maintaining a fixed distance between the dissolving spray nozzle and the exposed and erodible surface of the solid block of chemical. See, for example, commonly owned U.S. Pat. No. 4,687,121, issued to Copeland on Aug. 18, 1987; U.S. Pat. No. 4,690,305, issued to Copeland on Sep. 1, 1987, and U.S. Pat. No. 4,826,661, issued to Copeland et al May 2, 1988. Alternatively, a separate control system has regulated the amount of detergent dispensed and has maintained a constant concentration, thereby making it unnecessary to control the nozzle-to-eroding surface distance.

In many situations, however, it is desirable for the chemical concentration to be variable. The optimum chemical concentration depends upon such factors as the type of solid chemical being dispensed, the type of surface being cleaned, the amount of soil being removed from the fabric or surface being cleaned, the temperature of the solvent, the degree of mechanical action applied to the fabric or surface being cleaned, and the volume of cleaning solution being produced.

In the past, adjusting the concentration of the cleaning solution has typically been done manually by the operator. That is, a certain amount of cleaning solution has been dispensed from the solid chemical, to which a certain amount of water is added. If a higher use solution concentration is desired, then less water is added to the concentrated cleaning solution. However, this procedure does not result in a consistent, precise, and controlled solution concentration, and often results in the use solution having either too much or too little cleaning chemical concentration.

Accordingly, a need exists for a dispensing apparatus which can simply, safely, efficiently and inexpensively dispense a concentrated chemical solution from a solid block of wash chemical at predictably variable and adjustable concentrations.

SUMMARY OF THE INVENTION

It has been discovered that the rate of detergent dispensed can be varied by adjustment of the distance between the nozzle and the detergent product. The dispenser has a spray nozzle for directing a solvent, preferably water, upon the exposed and eroding surface of a solid chemical. Adjustment means varies the distance between the spray nozzle and the eroding surface. The adjustment means may comprise means for moving the spray nozzle and/or means for moving the solid chemical. In the preferred embodiment, the solid block chemical is supported by a screen, and the preferred adjustment means comprises a cam support assembly for moving the position of the solid chemical with respect to a fixed nozzle.

Another aspect of the present invention is a method for dispensing a solid chemical, comprising the steps of: directing a solvent through an inlet line and a spray nozzle, adjusting the distance between the spray nozzle and the solid chemical's eroding surface to adjust the concentration of chemical dispensed, and impinging the solvent from the spray nozzle onto the eroding surface of the solid chemical.

The present invention is configured to vary the distance between the spray nozzle and the exposed and erodible surface of the solid block of chemical. This feature allows the user to vary the rate of chemical dispensed, based upon the type of chemical and the particular application. For a cleaning application, the optimum dispensing rate will be determined by the type of detergent, the type and amount of soil being removed, the type of fabric or hard surface being cleaned, the temperature of the solvent, and other factors. In this manner, the amount of cleaning chemical dispensed can more accurately meet the particular requirements of the situation and allow for improved quality and efficiency. The invention prevents underuse of the cleaning chemical and thereby provides sufficient cleaning product for the task, while at the same time preventing over-use of the cleaning product, which can result in undesirable residue and waste.

Another advantage of the present invention is that the solution concentration is readily adjustable. The concentration of cleaning chemical dispensed can be quickly changed by the user manually, or the concentration can be automatically controlled by suitable electronic means, such as an electrical and mechanical arrangement utilizing a manual control knob and a cable, or a more complex feedback mechanism, such as a servo system, for fully automatic control.

Yet another advantage of the present invention is that it allows for use of a solid block detergent, with its accompanying benefits of minimizing the possibility of skin contact with the wash chemical, allowing the solid wash chemical to be formed and packaged in the single step, and having predictable dissolving characteristics. A solid detergent also permits the combination of non-compatible ingredients, such as a silicon defoamer and a surfactant, which could not be effectively combined as liquids.

As used herein, the term "utilization point," when used in combination with concentrated chemical solution, refers to the point where the solution is used or stored, i.e., a wash tank, a reservoir, a spray nozzle, etc.

As used herein, the term "cleaning composition" refers to those compounds or mixtures commonly added to aqueous liquids to aid in the cleaning and rinsing of fabrics, wares, and hard surfaces. Such chemicals include detergents, softeners, bleaches, rinse aids, etc.

BRIEF DESCRIPTION OF THE DRAWINGS

FIG. 6 is a perspective view of an upper portion of the dispenser assembly shown in FIGS. 2–5.

FIG. 7 is a top plan view of the visual indication means of the dispenser assembly shown in FIGS. 2–6.

DETAILED DESCRIPTION OF THE PREFERRED EMBODIMENT

Figure 1:
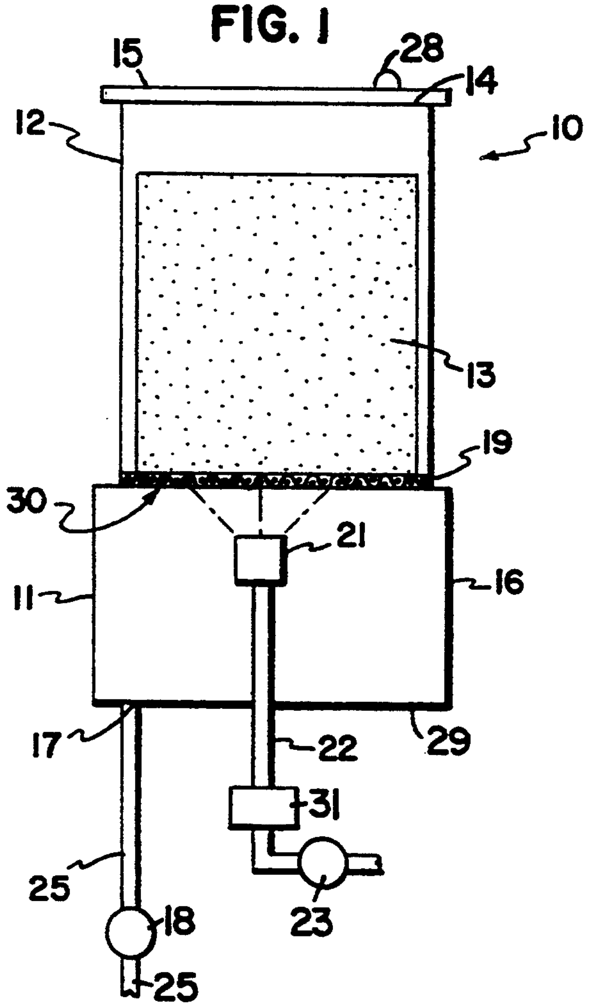
FIG. 1 is a schematic block diagram illustrating the flow paths for the dispenser of this invention.

Referring to the Drawings, FIG. 1 illustrates the dispenser 10 of the present invention. The dispenser 10 has a housing 11. The housing 11 includes an upper storage portion 12 for retainably holding a mass of solid block chemical 13. Preferably, the storage portion 12 has an upwardly disposed access port 14 through which a solid block chemical 13 is loaded into the housing 11. The access port 14 is normally covered by a door 15 mounted onto the housing 11. The door 15 is sized to completely cover and sealingly engage the access port 14.

The housing 11 also includes a lower collector portion 16. The collector portion 16 may have a horizontal bottom wall 29, or it may be configured in a funnel shape that converges downwardly to an outlet port 17.

The housing 10 may be designed for mounting so that the vertical height of the outlet port 17 can be higher than the utilization point (not shown). A conduit 25 is connected to the outlet port 17 of the housing 11 for directing the chemical solution, by means of gravity feed, from the collector portion 16 of the dispenser 10 to a utilization point. Optionally, a pump 18 may be utilized to direct the solution to the utilization point.

The solid block of wash chemical 13 is housed in a sturdy container having at least one exposed surface and a removable cap or lid (not shown) which encloses the exposed surface before use. At the point of use, the cap or lid is removed, the container inverted over the access port 14 of the dispenser 10 and the chemical positioned in the dispenser 10.

The solid block of chemical 13 is supported by a horizontal screen 19, as shown in FIG. 1. The chemical 13 may be removed from its container and placed on the screen 19, or the chemical 13 may be retained in the container in which the chemical was cast and shipped. If the dispenser permits the block of wash chemical 13 to be "popped out," the chemical container must have an open face 68 at least as large and preferably slightly larger than its base 69 and must have no inner peripheral bumps, ridges, or edges which can prevent the solid block of wash chemical 13 from sliding out of the container so that the chemical container is retained within the dispenser 10 during dispensing of the chemical 13.

In the preferred embodiment, the screen 19 is a flat, generally horizontal, continuous support screen which is mounted to the inner walls of the housing 11 at a position which defines the intersection of the support storage portion 12 and the lower collector portion 16. The support screen mesh size supports the solid block of wash chemical 13 without significantly impeding access of a water spray onto the lower face 30 of the wash chemical 13 (typically about 5/32 inch (0.4 cm) openings).

The dispenser 10 as disclosed herein is in a vertical configuration, in which the solid chemical 13 is positioned above the spray nozzle 21. It is to be understood that a different configuration could be utilized, for example, in which the spray nozzle 21 directs a horizontal spray onto the eroding surface 30, and the eroding surface 30 is maintained against a vertical support screen 19 by means of suitable biasing means behind the solid chemical 13.

Spray forming means are mounted in the housing 11. The spray forming nozzle 21 is connected to a pressurized source of water (or other solvent) by means of a water supply line 22. A spray control means, comprising a valve 31 in the water supply line 22, controls the flow of water to the spray forming nozzle 21. The valve 31 may be a control valve capable of varying the rate of water flow therethrough. The valve 31 normally blocks water flow to the nozzle 21 and is operative to its open position only upon receipt of an external control signal. Upon receipt of such a control signal, the valve 31 opens and water flow is allowed to flow through the supply line 22. The water is dispersed by the spray forming means 21 into engagement with substantially the entire lower surface 30 of the chemical block 13.

Spray from the nozzle 21 is of relatively low pressure (typically 10 to 25 p.s.i.) and wets only the lower portion 30 of the solid block chemical 13. A metering pump 23 may be provided in the inlet line 22 to allow for adjustment of the flow rate of water, depending upon the desired volume and flow rate of cleaning solution being dispensed. The dissolved chemical passes in solution through the support screen 19, is directed by the collector portion 16 of the housing 11 to the outlet port 17, and passes through a chemical solution conduit 25 to the utilization point or reservoir (not shown).

Optionally, a ¼ to 1/20 inch (0.64–0.13 cm) lower screen (not shown) is located in the collector portion 16 of the housing 11 proximate the outlet port 17 to catch any undissolved chunks of chemical which have broken away from the main block 13 and which are small enough to pass through the support screen 19. This prevents small chunks of chemical from collecting in the outlet port 17 or the conduit 25 and blocking the flow of concentrated chemical solution out of the dispenser 10.

An electrically or mechanically actuated safety control switching circuit can be connected to sense the operative position of the door 15 covering the access port 14 in order to prevent water spray from the nozzle 21 whenever the door 15 is not in its closed position overlying the access port 14, or whenever there is no solid chemical in the dispenser 10. This prevents the spray of concentrated chemical solution while the operator is loading the dispenser. A safety control switch 28 may be mounted upon the door 15.

In the preferred embodiment, the solid wash chemical's position is vertically movable with respect to a fixed spray nozzle. A preferred mechanism for adjusting the vertical position of the solid chemical is illustrated in FIGS. 2–7. The housing 11 of the dispenser 10 is preferably cylindrical in shape and made of a suitable plastic material. The housing's bottom surface 53 has an outlet port in fluid communication with the outlet line 25, and an inlet port in fluid communication with the water inlet line 22. The upper end 55 of the housing 11 has an open face 70 (see FIG. 5).

Positioned above the housing 11 is the product container 20, which is preferably substantially cylindrical in shape and has an outer diameter slightly smaller than the inner diameter of the housing 11. Contained within the product container 20 is the solid product 13, such as detergent. In the preferred embodiment, the detergent 13 is cast, shipped and stored in the container 20. The product 13 is supported upon a screen 19, as shown in FIG. 6. The product container 20 has a pair of oppositely disposed, longitudinal keyed portions 65, which extend vertically the entire height of the product container 20. The chemical product 13 has corresponding longitudinal keyed portions.

Figure 4:
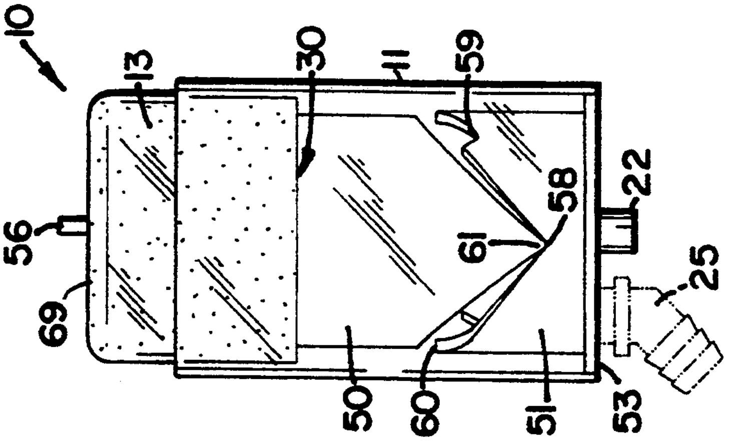
FIG. 4 is a side elevational view of the dispenser, with the cam support assembly holding the solid chemical in its lowest position.
Figure 3:
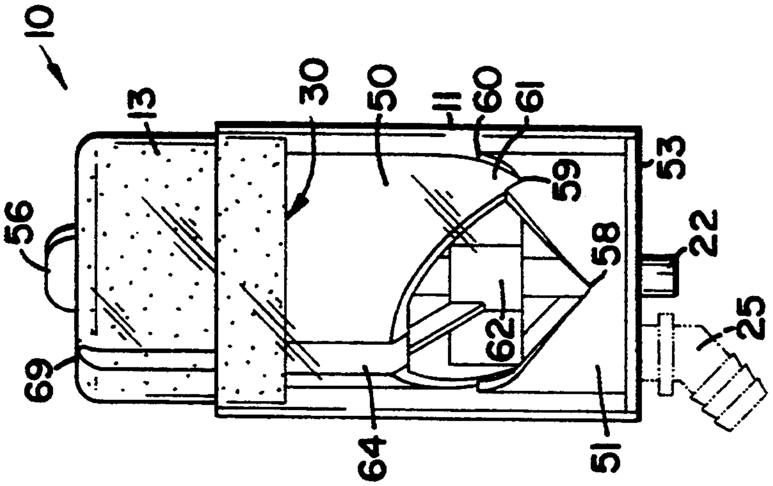
FIG. 3 is a side elevational view of the dispenser, with the cam support assembly holding the solid chemical in its middle position.

Within the housing 11 is the spray nozzle 21 which is connected to the upper portion 9 of the inlet line 22. In the preferred embodiment illustrated in FIGS. 3–6, the position of the spray nozzle is fixed and is not adjustable in a vertical direction. Thus, the position of the spray nozzle in FIGS. 3 and 4 is the same as the position shown in FIG. 2, even though the spray nozzle is hidden from view in FIGS. 3 and 4.

The preferred adjustment means comprises a pair of cooperating cam support members 50, 51. The support members 50, 51 allow for adjustment of the solid chemical 13 at three levels: the highest level illustrated in FIG. 3, the middle level illustrated in FIG. 4, and the lowest level illustrated in FIG. 5. In the preferred embodiment, the cam members 50, 51 are each constructed as separate members which have been molded from a suitable plastic material.

The lower cam member 51 is annular, and has a flat, bottom surface 57 which is interconnected to the bottom wall 53 of the housing 11 by adhesive or other suitable means. The upper surface of the cam member 51 has a jagged profile by virtue of a plurality of notches. The profile of the cam member 51 is symmetrical, with each half of the cam member 51 having a low notch 58, a medium notch 59, and a high notch 60.

In the preferred embodiment, the upper cam member 50 is also annular and has the same diameter as the lower cam member 51. A central sleeve 62 is located within the interior of the cam member 50, with a plurality of radial flanges 61 extending from a central sleeve 62. The sleeve's aperture receives the water inlet line 22 and is operatively connected thereto. The upper cam member 50 is also symmetrical, having a pair of downwardly extending points 63 which are oppositely disposed. The points 63 are sized and configured to fit within the notches 58, 59, 60 of the lower cam member 51.

The cam member 50 has a pair of oppositely disposed grooves 64. The grooves 64 are sized and configured to be slightly larger than the keyed portions 65 in the product container 20. Because of the nesting of the cam grooves 64 with the container keyed portions 65, rotation of the product container 20 results in corresponding rotation of the solid chemical 13, and the product container 20 constitutes a "control knob" for adjustment of the solid chemical's position. The product container 20 may be provided with ridges (not shown) on its exterior surface to facilitate its rotation. The upper portion of the product container 20 preferably has an upwardly extending handle 56 to facilitate adjustment of the product container's position. The keyed portions 65 are shown as semi-circular in cross-section, but could be of any desired shape. Furthermore, more than two keyed portions could be provided.

Figure 2:
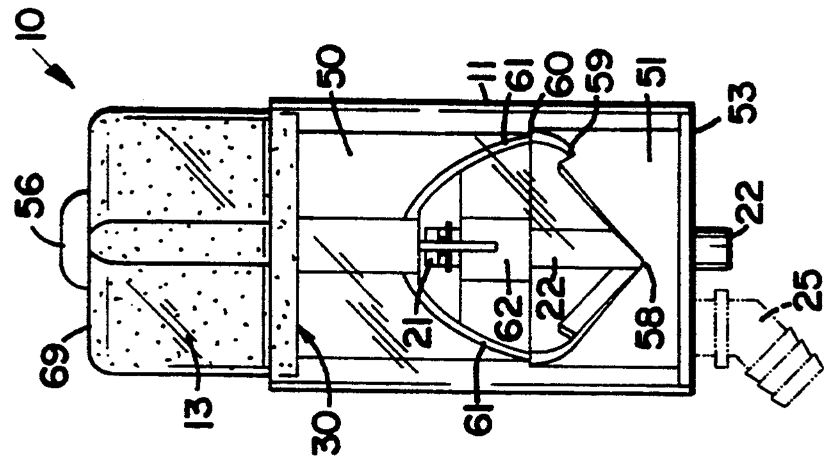
FIG. 2 is a side elevational view of the preferred dispenser, with the cam support assembly holding the solid chemical in its highest position.
Figure 5:
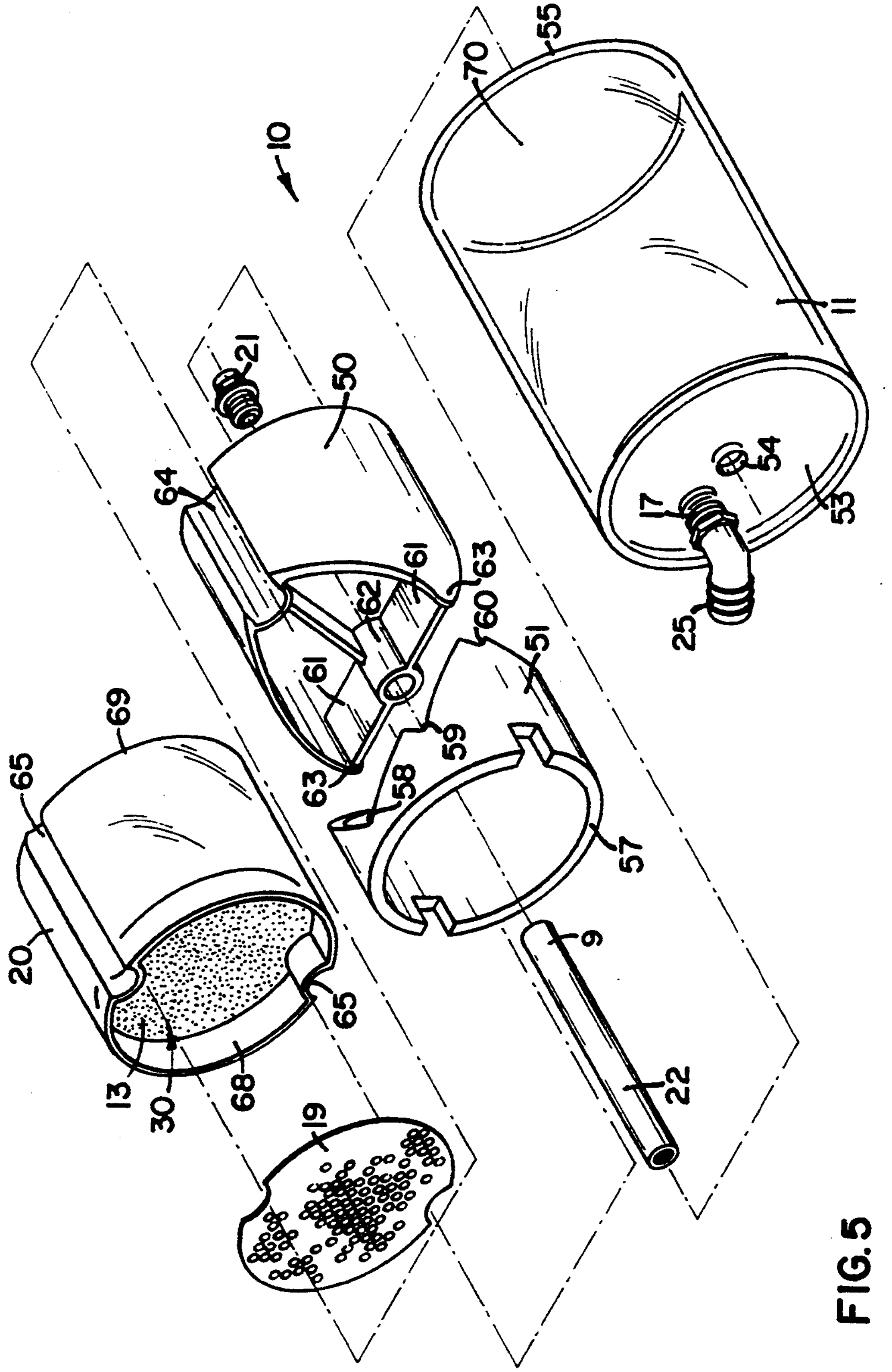
FIG. 5 is an exploded, perspective view of the cam support assembly shown in FIGS. 2–4.

As illustrated in FIG. 2, the product 13 is at its highest level when the points 61 are positioned within the high notches 60. As shown in FIG. 3, the solid product 13 and eroding surface 30 are in a middle position when the points 61 are positioned within the medium notches 59. Similarly, the low position, illustrated in FIGS. 4 and 6, occurs when the points 61 are positioned within the low notches 58. Because the spray nozzle's position is fixed, the low position illustrated in FIGS. 5 and 7 means that the nozzle-to-eroding surface distance is minimized, whereas the high position illustrated in FIG. 3 means that the nozzle-to-eroding surface distance is maximized. Therefore, the high position of the solid product 13 in FIG. 2 corresponds to a relatively low detergent concentration, the intermediate position of the solid chemical 13 in FIG. 3 corresponds to a medium concentration level, and the low position of the solid chemical 13 illustrated in FIGS. 4 and 6 corresponds to a relatively high concentration of the detergent solution.

As illustrated in FIG. 7, the dispenser 10 preferably has concentration indication means, such as a plate 71 which surrounds the product container 20, upon which is printed suitable descriptions of the concentration level for the user, such as "High," "Medium" and "Low". The top 69 of the product container 20 may be provided with an arrow 72 to allow the user to easily adjust the radial position of the solid chemical 13 and therefore the height of the solid chemical 13.

An alternative adjustment means to the above-described cam mechanism is a threaded arrangement which allows the height of the solid chemical 13 to be continuously adjustable, rather than having only three settings. The plate 71 surrounding the product container 20 could have a plurality of corresponding markings for assisting the user in setting the desired concentration.

In another embodiment of the invention, the spray nozzle 21 is mounted to be movable and vertically adjustable. The spray nozzle 21 may be mounted upon a threaded cylinder or a rack and pinion gear arrangement to provide for such adjustment. Furthermore, it is within the scope of the invention to move both the nozzle position and the eroding surface to control the distance therebetween and the resulting concentration.

Preferably, there are two or more keyed portions 65 in the product container 20 which interlock and cooperate with the rotatable cam mechanism 50. It is possible to cast certain types of solid chemicals in only a predetermined type of dispenser container 20 for safety or inventory control. For example, this type of system could ensure that a highly alkaline detergent is not placed into a dispenser 10 which is accessible by the user's hands.

The distance between the nozzle 21 and the eroding surface 30 affects the area of the eroding surface which is directly impinged from the water sprayed by the nozzle 21. As shown in FIG. 1, only a central portion of the eroding surface 30 may be directly impinged by the water when the product 13 is in its low position. As the solid product 13 is raised (and/or as the nozzle is lowered), a larger amount of eroding surface 30 is impinged, until the entire eroding surface 30 is impinged for "full cone coverage." If the nozzle-to-eroding surface distance is increased beyond that point, then an outer portion of the water spray will impinge the inner walls of the housing 12 before reaching the solid chemical 13.

The concentration can be effectively controlled and adjusted even when the spray nozzle 21 is above or below the point at which full cone coverage is achieved. However, the screen 19, water pressure, and distance between the nozzle 21 and the eroding surface 30 should be such that the lower surface 30 of the chemical 13 is substantially flat and not convex. It has been found that the channeling of water around the screen 19 tends to allow for a relatively uniform rate of dissolution and a relatively flat configuration of the chemical block's lower surface 30.

The optimum distance between the nozzle 21 and the eroding surface 30 will depend upon the diameter of the solid chemical 13. The solid chemical 13 may be cast in various sizes and configurations, although in the preferred embodiment, the solid chemical 13 is a cylindrical mass having a diameter of approximately 3 inches (7.6 cm). Furthermore, a variety of nozzle configurations can be utilized, although the preferred embodiment uses a nozzle with a 90° spray angle. Assuming a nozzle having a spray angle in the range of 60°–120° and assuming that R is the radius of the solid product 13, the preferred nozzle-to-eroding surface distance is approximately $\frac{1}{2}$ R to 2 R. That is, for a three inch diameter solid chemical, the preferred distance would be approximately 0.75 inches to 3 inches. For a nozzle having a different spray angle, the above range would be somewhat different depending upon the geometry of the situation. As used herein, the words "diameter", "radius" and the letter "R" are not meant to imply that the solid product 13 must be circular in cross-section. Rather, the chemical 13 could have a different cross-sectional shape, such as square, octagonal, etc.

Although the present invention is described in conjunction with a solid block concentrate 13 and a flat screen 19, it is to be understood that the invention could also be utilized with a powdered concentrate in conjunction with a relatively fine screen. The screen may be either horizontal or convex.

In operation, a container 20 containing a block of solid chemical 13 is loaded into the housing 11 through the access port 14. The container cap (not shown) is removed, the container 20 is inverted and the open face or exposed surface 30 of the solid wash chemical 13 is placed upon the support screen 19. The cross-sectional area of the wash chemical block 13 should be about the same size as the cross-sectional area of the housing 11 to allow the block 13 to rest flatly upon the support screen 19 and to prevent water spray from passing along dispenser housing's inner wall or onto the door 15.

The water follows a fluid flow path from the water source through water supply line 22 to spray-forming nozzle 21 whenever the valve 31 is opened, either electronically or manually. When provided with fluid flow therethrough, spray-forming nozzle 21 will direct a spray pattern at the bottom surface 30 of the solid chemical 13, wetting the lower portion of the chemical 13, which dissolves and passes in solution through optional support screen 19 to the collector portion 16 of the housing 11. The concentrate detergent solution passes through the outlet port 17 of housing member 11 and is directed by conduit 25 to a reservoir or utilization point.

The concentration of the detergent solution is controlled either manually by the user or automatically by means of suitable sensing means, such as a conductivity sensor. In the preferred embodiment, the lowering of the solid chemical 13 with respect to the fixed nozzle 21 results in an increased concentration of the detergent solution. Alternatively, increasing the concentration of the detergent solution may be accomplished by raising the spray nozzle's 21 position vertically, and a decrease in concentration may be accomplished by lowering the spray nozzle's 21 position.

Disclosed below in Example I is the procedure utilized to generate the data for the dissolving characteristics of the dispenser 10. Based upon such data concerning the effect of the nozzle-to-eroding surface distance, a regression model can be developed. This regression model is utilized to predict the resulting chemical concentration when a certain spray nozzle-to-eroding surface distance is set. Other variables such as the voltage of the pump 23 and the water temperature will affect the solution concentration. That is, increased water pressure and increased temperature result in a larger amount of solid chemical 13 being dissolved and a higher concentration of the solution. However, the nozzle-to-eroding surface distance is a more important determinant of solution concentration than pump voltage, water temperature and water pressure.

EXAMPLE I

A cylindrical container having an diameter of about 3.5 inches (8.9 cm) and a height of about 3 inches (7.6 cm) were filled with one pound (0.45 kg) of a floor cleaner detergent as described in Example II (below).

The container 20 was allowed to cool to room temperature before dispensing.

The container 20 was placed in a dispenser similar to the dispenser 10 of this invention, with the chemical 13 being supported upon a flat horizontal screen 19. The screen 19 was a metal plate with 5/32 inch (0.4 cm) round holes spaced approximately 5 to the inch (approximately 2 to the cm). The nozzle had a 90° spray angle and was manufactured by Spraying Systems Inc. The position of the screen carriage was moved vertically, thereby moving the exposed chemical surface, so that the distance between the spray nozzle 21 and the exposed erosion surface 30 of the detergent ranged from about one inch (2.5 cm) to about two inches (5.1 cm).

In separate tests, the water was maintained at a temperature of about 50° F. and 80° F. and was sprayed at a pressure of about 10 psi and 30 psi onto the exposed erosion surface of the detergent to produce a 5 liter sample. The amount of detergent dispensed was measured by weighing the container immediately before and after the spray.

The results of the experiment are tabulated in Table 1. As is clearly shown, the concentration of the detergent solution dispensed increased as the distance between the spray nozzle 21 and the erosion surface 30 decreased. A 1.5 inch (3.8 cm) difference in distance between the spray nozzle and the eroding surface caused approximately a two to three times effect on the detergent concentration.

TABLE I (10 psi; 50° F.)

| Nozzle to Surface Distance (Inches) | PPM Dissolved |
|---|---|
| 1.0 | 697 |
| 1.5 | 581 |
| 2.0 | 332 |

TABLE II (30 psi; 50° F.)

| Nozzle to Surface Distance (Inches) | PPM Dissolved |
|---|---|
| 1.0 | 663 |
| 1.5 | 646 |
| 2.0 | 210 |

TABLE III (10 psi; 80° F.)

| Nozzle to Surface Distance (Inches) | PPM Dissolved |
|---|---|
| 1.0 | 1016 |
| 1.5 | 765 |
| 2.0 | 333 |

TABLE IV (30 psi; 80° F.)

| Nozzle to Surface Distance (Inches) | PPM Dissolved |
|---|---|
| 1.0 | 1549 |
| 1.5 | 1200 |
| 2.0 | 557 |

Chemical Compositions

Disclosed below in Examples II through VIII is a non-exhaustive list of chemical compositions which may be cast or compressed into solid blocks 13 and utilized in the dispenser of this invention.

EXAMPLE II

Industrial Floor Cleaner

| Raw Material | Wt % |
|---|---|
| Nonylphenol ethoxylate | 7.00 |
| (6.5 moles ethylene oxide) | — |
| Carbowax 8000[1] | 18.60 |
| (polyethylene oxide, 150 moles) | — |
| Goodrite K-7058D[2] | 25.36 |
| (polyacrylate from B. F. Goodrich Chemicals) | — |
| FRAGRANCES | 2.84 |
| Dow Antifoam 1500[3] | .50 |
| (Simethicone from Dow Corning) | — |
| Dye | 0.02 |
| Water | 3.00 |
| Nonylphenol ethoxylate | 42.68 |
| (9.5 moles of ethylene oxide) | — |
| | 100.0 |

[1] Trademark - Union Carbide
[2] Trademark - B. F. Goodrich Chemical Co.
[3] Trademark - Dow Corning Co.

Processing was undertaken using a 1000 gallon North/South Wildon diaphragm pump and a Tekmar processor with coarse, medium, and fine generators. Preparation of the floor cleaner was initiated by draining all lines of residual water before starting. The Nonylphenol ethoxylate (6.5 moles EO) was charged into the mixing tank. Agitation in the tank was set at 40–50 rpm with the heat set at 150° F. The Nonylphenol ethoxylate was recirculated for one minute so that it cleaned the recirculation piping of all residual water. When the temperature reached 140°–150° F., the Carbowax 8000 was added and agitated until dissolved. The temperature was kept at 150°–155° F. before proceeding. The Goodrite K-7058D was agitated until well dispersed. The batch was allowed to cool during this addition. The Fragrances and Dow Antifoam 1500 were added with recirculation through the Tekmar. The dye and water were then premixed and the agitator speed was increased to 100–110 rpm as the premix was added to the batch. The Nonylphenol ethoxylate (9.5 moles EO) was then added and the agitator speed was decreased to 40–50 rpm.

The composition was then packaged at 150°–170° F. by adjusting the fill to about one pound per tub, snapping the closure securely on the tub, and using a hot melt to seal the tub cases. The product was then cooled in a chiller tunnel for a minimum of 30 minutes before casing, using 0°–15° F. forced air.

EXAMPLE III

High Alkaline Industrial Laundry Detergent

| Raw Material | Wt % |
|---|---|
| Sodium hydroxide - 50% | 26.00 |
| Dequest 2000[1] | 17.00 |
| Polyacrylic acid - 50% M.W. 5000 | 6.50 |
| Nonylphenol ethoxylate 9.5 mole ratio | 14.00 |
| Tinopal CBS[2] | 0.075 |
| Sodium hydroxide | 36.425 |
| | 100.0 |

[1] Trademark - Monsanto Chemical Co.
[2] Trademark - Ciba-Giegy

All ingredients except the sodium hydroxide were mixed together and melted at a temperature of about 170° F. The sodium hydroxide was then added and mixed until a uniform product was obtained. The product was poured into a container and cooled.

EXAMPLE IV
Institutional Dishwashing Detergent

| Raw Material | Wt % |
|---|---|
| Sodium hydroxide 50% solution | 50.0 |
| Sodium hydroxide bead | 25.0 |
| Sodium tripolyphosphate | 25.0 |
| | 100.0 |

The sodium hydroxide bead was added to the sodium hydroxide 50% solution, heated to 175° F. and mixed. The sodium tripolyphosphate was then added and mixed until uniform, about 10 to 20 minutes. This mixture was poured into a container and cooled rapidly to solidify the product.

EXAMPLE V
Solid Rinse Aid

| Raw Material | Wt % |
|---|---|
| Polyethylene glycol (M.W. 8000) | 30.0 |
| Sodium xylene sulfonate | 20.0 |
| Pluronic(1) L62 | 40.0 |
| Pluronic(1) F87 | 10.0 |
| | 100.0 |

(1)BASF Wyandotte trademark for ethyleneoxide-propyleneoxide block copolymers.

The polyethylene glycol was melted at a temperature of about 160° F. The sodium xylene sulfonate granules or flakes were added and mixed into the polyethylene glycol melt. Pluronic L62 and F87 were then added and mixed until the melt was uniform, about 10 to 20 minutes. The mixture was then poured into a container and allowed to cool and solidify.

EXAMPLE VI
Neutral Hard Surface Cleaner

| Raw Material | Wt % |
|---|---|
| Nonyl phenol ethoxylate 15 moles of ethylene oxide | 80.0 |
| Polyethylene oxide M.W. 8000 | 20.0 |
| | 100.0 |

The nonyl phenol ethoxylate 15 moles of ethylene oxide and polyethylene oxide were mixed together and melted at a temperature of about 160° to 180° F. The product was then poured into a container and cooled below its melting point of about 150° F.

EXAMPLE VII
Laundry Detergent (Low Alkalinity)

| Raw Material | Wt % |
|---|---|
| Polyethylene oxide M.W. 8000 | 25.40 |
| Neodol 25-7, Linear Alcohol Ethoxylate(1) | 30.0 |
| Dimethyl distearyl ammonium chloride | 3.0 |
| Tinopal CBS, Optical Dye(2) | 0.1 |
| Carboxymethyl cellulose | 1.5 |
| Sodium tripolyphosphate | 35.0 |
| Sodium metasilicate | 5.0 |
| | 100.0 |

(1)Trade name - Shell Chemical Co.
(2)Trade name - Ciba Giegy

The polyethylene oxide and the dimethyl distearyl ammonium chloride were mixed together and melted at a temperature of about 160° to 180° F. The remaining items were then added to the hot melt and mixed until a uniform product was obtained, about 10 to 20 minutes. The mixed product thusly obtained was then poured into a container and cooled below its melting point of about 140° F.

One thousand, three hundred grams of sodium hydroxide was placed in a 4 liter glass beaker and heated under agitation to about 190°-200° F. Eight hundred, fifty grams of Dequest 2000 and 325 grams of 50% solution polyacrylic acid, molecular weight 5,000 were slowly added to the 50% sodium hydroxide solution contained in the glass beaker. Six hundred, ninety grams of nonylphenol ethoxylate, 9.5 mole ratio, 4 grams of Tinopal CBS, and 1,831 grams of sodium hydroxide were added together and heated to about 180°-190° F. The two melts were then combined in the beaker and agitated for about 30 minutes. The solution was slowly cooled under constant agitation to about 160° F. The product was then poured into a plastic package and sealed.

EXAMPLE VIII
Solid Sour Soft

| Raw Material | Percent |
|---|---|
| Arosurf TA-100[1] | 12 |
| Hexylene glycol | 13 |
| Sokalan DCS[2] | 75 |

(1)Trademark, Sherex Chemical Company (distearyl dimethyl ammonium chloride)
(2)Trademark, BASF Germany (mixture of succinic, adipic and glutaric acids)

Five hundred, twenty grams of hexylene glycol and 480 grams of Arosurf TA-100 were placed in a 4 liter glass beaker and heated to 180°-190° F. to melt the Arosurf TA-100. This melt was maintained at 190°-200° F. and constantly agitated while 3,000 grams of Sokalan DCS was added. After addition of the Sokalan DCS the mixture was agitated for 30 minutes to ensure a homogeneous mixture, poured into a plastic package and sealed.

The compositions described in Examples III and IV are most favorably dispensed in the dispenser of this invention because contact with these highly alkaline products can be harmful.

Other modifications of the invention will be apparent to those skilled in the art in light of the foregoing description. For example, two dispensers 10 could be utilized for dispensing two different types of solid products 13 which are incompatible with each other. Proximate the utilization point, the two solutions could be combined.

This description is intended to provide concrete examples of individual embodiments clearly disclosed in the present invention. Accordingly, the invention is not limited to these embodiments or to the use of specific elements therein. All alternative modifications and variations of the present invention which fall within the spirit and broad scope of the appended claims are covered.

What is claimed is:

1. A dispenser for a solid chemical, comprising:

(a) a spray nozzle for directing a solvent upon an eroding surface of a solid chemical, said chemical being located within a housing, wherein the chemical immediately adjacent said spray nozzle is dissolved and passes out of said dispenser in solution form, wherein said solid chemical is supported upon a screen above said spray nozzle;

(b) adjustment means for varying a distance between said spray nozzle and said screen, said distance being variable between a first, high concentration setting and a second, low concentration setting, said spray nozzle having a fixed position and said screen being vertically movable between a first position and a second position, wherein a concentration of the chemical in the solution is adjustable between said high concentration setting and said low concentration setting; and (c) indication means operatively connected to said adjustment means for displaying the screen positions which correspond to said high concentration setting and said low concentration setting.

2. The dispenser according to claim 1, wherein said adjustment means comprises means for moving said spray nozzle.

3. The dispenser according to claim 1, wherein said adjustment means comprises means for moving said eroding surface of said solid chemical.

4. The dispenser according to claim 3, wherein said adjustment means comprises an upper and a lower cam member, said upper cam member supporting the chemical, wherein rotation of said upper cam member results in vertical adjustment of the eroding surface of the chemical.

5. The dispenser according to claim 4, wherein said cam members have a plurality of corresponding notches which provide at least three levels of height adjustment of the solid chemical.

6. The dispenser according to claim 4, wherein said solid chemical and a solid chemical housing have corresponding keyed portions, wherein said keyed portions extend longitudinally along a side surface of said housing.

7. The dispenser according to claim 1, wherein said adjustment means comprises means for moving said spray nozzle and means for moving said eroding surface of said chemical.

8. The dispenser according to claim 1, wherein said chemical is in solid form and is supported by a screen.

9. The dispenser according to claim 8, wherein a radius of the solid chemical is R, and said nozzle has a spray angle of approximately 90 degrees, and the distance between said spray nozzle and said eroding surface is adjustable from approximately $\frac{1}{2}$ R to 2 R.

10. The dispenser according to claim 9, wherein said screen has openings of approximately 0.4 cm.

11. The dispenser according to claim 1, wherein said solvent is water.

12. A method for dispensing a solid chemical having an eroding surface, comprising the steps of:

(a) providing the apparatus of claim;

(b) directing a solvent through an inlet line, said inlet line being in fluid communication with a fixed spray nozzle, wherein the chemical proximate the spray nozzle is dissolved and passes in a solution;

(c) adjusting a distance between said spray nozzle and said screen between a first, high concentration setting and a second, low concentration setting by adjusting a vertical position of said screen, wherein the concentration of chemical dispensed is adjusted between a high concentration and a low concentration; and (d) impinging the solvent from said spray nozzle upon said eroding surface of said solid chemical.

13. The method according to claim 12, wherein said distance adjustment step comprises moving said spray nozzle.

14. The method according to claim 12, wherein said distance adjustment step comprises moving said eroding surface.

15. The method according to claim 14, wherein the eroding surface is moved vertically by rotation of cam means.

16. The method according to claim 12, wherein said distance adjustment step comprises moving both said spray nozzle and said eroding surface.

17. The method according to claim 12, further comprising the step of placing said solid chemical upon a screen.

18. The method according to claim 12, wherein said distance adjustment step is in response to concentration sensing means.

19. The method according to claim 18, wherein said concentration sensing means including a conductivity sensor.

20. The method according to claim 12, further comprising the step of adjusting a flow rate of the solvent.

21. A dispenser for a solid cleaning chemical, comprising:

(a) a fixed spray nozzle for directing a solvent upon an eroding surface of a solid chemical, said chemical being located within a housing, wherein the chemical immediately adjacent the spray nozzle is dissolved and passes in a solution;

(b) a housing which encases the chemical, said housing including a screen which supports said chemical, said eroding surface being substantially exposed to said solvent; and (c) adjustment means for moving the solid chemical so as to vary a distance between said eroding surface and said spray nozzle, said solid chemical being vertically movable between a plurality of discrete settings, wherein a concentration of the solution is adjustable between a plurality of discrete settings, wherein said housing includes a cam means such that rotation of said housing results in vertical movement of the solid chemical.

* * * * *

UNITED STATES PATENT AND TRADEMARK OFFICE
CERTIFICATE OF CORRECTION

PATENT NO. : 5,389,344

DATED : February 14, 1995

INVENTOR(S) : Copeland et al.

It is certified that error appears in the above-identified patent and that said Letters Patent is hereby corrected as shown below:

On column 1, line 36, please insert --.,-- after the word "et al"

On column 2, line 2, please insert --.,-- after the word "et al"

On column 5, line 41, please delete "55" and substitute therefore --9--

On column 8, line 65, please delete "an" and substitute therefore --a--

On column 13, line 53, please delete "claim:" and substitute therefore --claim 1;"

Signed and Sealed this

Sixth Day of June, 1995

Attest:

Bruce Lehman

BRUCE LEHMAN

*Attesting Officer* *Commissioner of Patents and Trademarks*